(12) United States Patent
Nakamura et al.

(10) Patent No.: US 11,866,885 B2
(45) Date of Patent: Jan. 9, 2024

(54) SHEET PRODUCING METHOD AND SHEET PRODUCING APPARATUS

(71) Applicant: SEIKO EPSON CORPORATION, Tokyo (JP)

(72) Inventors: Masahide Nakamura, Nagano (JP); Naoko Omagari, Nagano (JP); Hidemasa Kanada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/823,526

(22) Filed: Aug. 31, 2022

(65) Prior Publication Data

US 2023/0062328 A1   Mar. 2, 2023

(30) Foreign Application Priority Data

Sep. 2, 2021 (JP) .................................. 2021-143078

(51) Int. Cl.
| | |
|---|---|
| *D21H 17/28* | (2006.01) |
| *D21F 3/02* | (2006.01) |
| *D21H 11/14* | (2006.01) |
| *D21F 7/00* | (2006.01) |

(52) U.S. Cl.
CPC ................ *D21F 3/02* (2013.01); *D21F 7/003* (2013.01); *D21H 11/14* (2013.01); *D21H 17/28* (2013.01)

(58) Field of Classification Search
CPC .......... D21F 3/02; D21F 7/003; D21H 11/14; D21H 17/28
USPC ......................................................... 162/175
See application file for complete search history.

(56) References Cited

U.S. PATENT DOCUMENTS

| | | |
|---|---|---|
| 2015/0204015 A1 | 7/2015 | Gomi et al. |
| 2016/0229093 A1 | 8/2016 | Gomi |
| 2017/0114484 A1 | 4/2017 | Tsujino |
| 2021/0301106 A1* | 9/2021 | Yokokawa ................ C08L 1/02 |

FOREIGN PATENT DOCUMENTS

| | | |
|---|---|---|
| JP | 2015-203163 A | 11/2015 |
| JP | 2016-204821 A | 12/2016 |
| JP | 2015-137437 A | 7/2017 |

* cited by examiner

*Primary Examiner* — Mark Halpern
(74) *Attorney, Agent, or Firm* — Global IP Counselors, LLP

(57) ABSTRACT

A sheet producing method includes a web forming step of forming a web by accumulating fiber in a dry system, a water providing step of providing the web with water, and a compression-heating step of compressing and simultaneously externally heating the web provided with water, wherein a water content of the web provided with water in the water providing step is 12% by mass or more, and a compression degree of the web between before and after the compression-heating step is ⅐ or less.

7 Claims, 4 Drawing Sheets

FIG. 3

| EXAMPLE/COMPARATIVE EXAMPLE | SAMPLE No. | FORMING CONDITION ||||||| EVALUATION RESULT ||||
|---|---|---|---|---|---|---|---|---|---|---|---|
| | | BINDER | WATER CONTENT [% by mass] | THICKNESS A [μm] | THICKNESS B [μm] | COMPRESSION DEGREE [1/X] | COMPRESSION TIME [sec] | STRENGTH [N·m/g] | DENSITY [g/cm³] | DROPPING OF WATER DURING COMPRESSION | REPEATED RECYCLE RC3/RC1 |
| EXAMPLE | 1 | — | 20 | 1800 | 150 | 1/12 | 0.6 | B | B | A | A |
| COMPARATIVE EXAMPLE | 2 | — | 20 | 1800 | 360 | 1/5 | 0.6 | C | C | A | B' |
| COMPARATIVE EXAMPLE | 3 | — | 20 | 800 | 160 | 1/5 | 0.6 | C | B | A | B' |
| EXAMPLE | 4 | — | 20 | 1800 | 113 | 1/16 | 0.6 | A | A | A | A |
| EXAMPLE | 5 | — | 20 | 1800 | 90 | 1/20 | 0.6 | A | A | A | B |
| COMPARATIVE EXAMPLE | 6 | — | 10 | 1800 | 180 | 1/10 | 0.6 | C | B | A | B' |
| EXAMPLE | 7 | — | 30 | 1800 | 138 | 1/13 | 0.6 | A | A | A | A |
| EXAMPLE | 8 | — | 50 | 1800 | 138 | 1/13 | 0.6 | A | A | B | A |
| EXAMPLE | 9 | — | 20 | 1800 | 150 | 1/12 | 0.3 | B | B | A | B |
| EXAMPLE | 10 | STARCH | 20 | 1800 | 150 | 1/12 | 0.6 | A | B | A | A |

US 11,866,885 B2

SHEET PRODUCING METHOD AND SHEET PRODUCING APPARATUS

The present application is based on, and claims priority from JP Application Serial Number 2021-143078, filed Sep. 2, 2021, the disclosure of which is hereby incorporated by reference herein in its entirety.

BACKGROUND

1. Technical Field

The present disclosure relates to a sheet producing method and a sheet producing apparatus.

2. Related Art

To date, sheet producing apparatuses for producing a new sheet from waste paper or the like serving as a raw material have been known. JP-A-2015-203163 discloses a sheet producing apparatus in which water is added so that the water content of a web is set to be 8% of the web mass, and the web may be compressed during heating so that the thickness of the web is set to be 1/5th to 1/10th of the original thickness.

However, when a sheet having high strength is produced using the sheet producing apparatus described in JP-A-2015-203163, the resulting sheet may not be suitable for repeated recycling.

SUMMARY

A sheet producing method includes a web forming step of forming a web by accumulating fiber in a dry system, a water providing step of providing the web with water, and a compression-heating step of compressing and simultaneously externally heating the web provided with water, wherein a water content of the web provided with water in the water providing step is 12% by mass or more, and a compression degree of the web between before and after the compression-heating step is 1/7 or less.

A sheet producing apparatus includes a web forming portion for forming a web by accumulating fiber in a dry system, a water providing portion for providing the web with water, and a compression-heating portion for compressing and simultaneously externally heating the web provided with water, wherein a water content of the web provided with water in the water providing portion is 12% by mass or more, and a compression degree of the web between before and after the compression-heating portion is 1/7 or less.

BRIEF DESCRIPTION OF THE DRAWINGS

FIG. 3 is a diagram illustrating a sheet forming condition and evaluation results.

DESCRIPTION OF EXEMPLARY EMBODIMENTS

1. First Embodiment

The embodiments according to the present disclosure will be described below. The embodiments described below describe examples of the present disclosure, but the present disclosure is not limited to the following embodiments and includes various modified forms realized within a range in which the scope of the present disclosure is not changed. In this regard, all the configurations described below are not limited to being indispensable configurations of the present disclosure.

A sheet producing method according to the present disclosure includes a web forming step of forming a web by accumulating fiber in a dry system, a water providing step of providing the web with water, and a compression-heating step of compressing and simultaneously externally heating the web provided with water. In the following description, first, an example of a sheet producing apparatus capable of realizing the sheet producing method according to the present embodiment will be described, and, subsequently, the sheet producing method will be described.

1-1. Sheet Producing Apparatus

Figure 1:
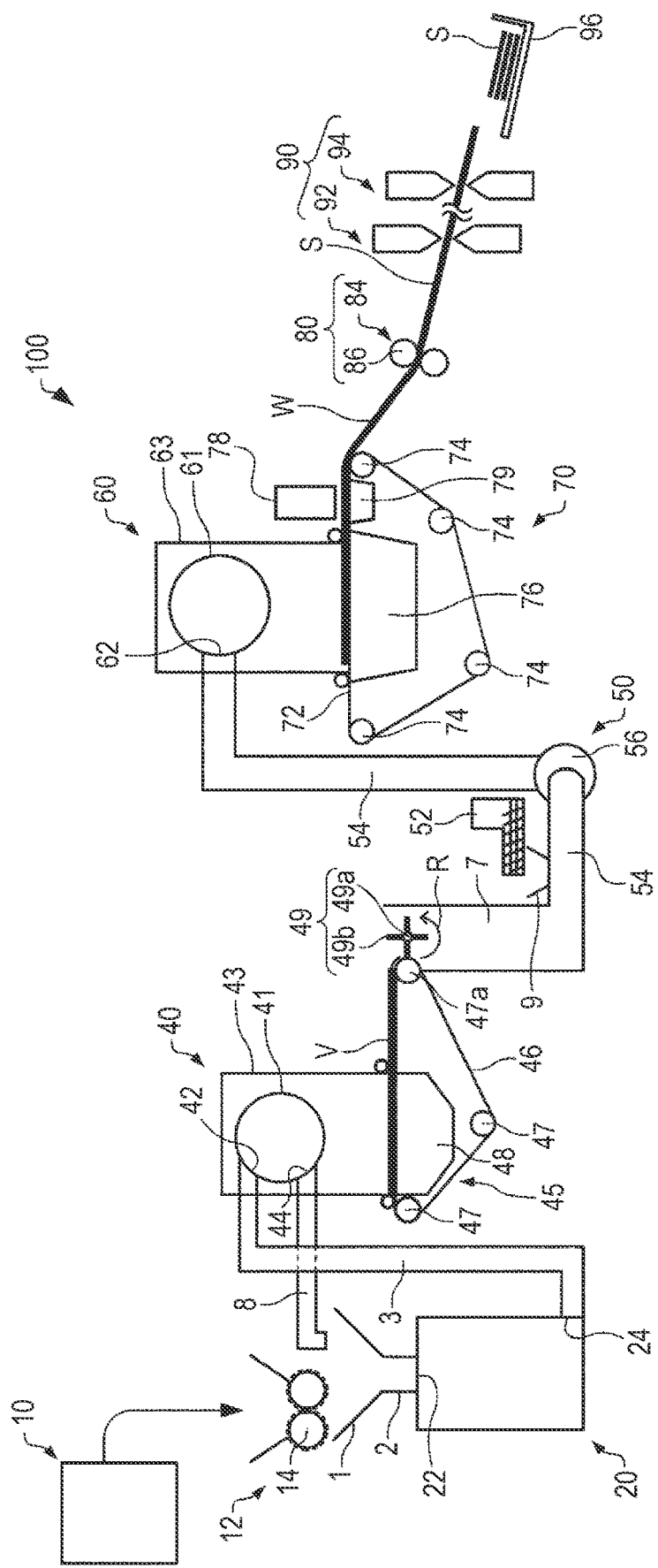
FIG. 1 is a schematic diagram illustrating a sheet producing apparatus according to a first embodiment.

FIG. 1 is a schematic diagram illustrating a sheet producing apparatus 100 according to the present embodiment. The sheet producing apparatus 100 that is an example of a sheet producing apparatus capable of realizing the sheet producing method according to the present embodiment will be described with reference to FIG. 1.

As illustrated in FIG. 1, the sheet producing apparatus 100 includes, for example, a supply portion 10, a coarse crushing portion 12, a defibration portion 20, a sorting portion 40, a first web forming portion 45, a rotator 49, a mixing portion 50, an accumulating portion 60, a second web forming portion 70, a sheet forming portion 80, and a cutting portion 90.

The supply portion 10 supplies a raw material to the coarse crushing portion 12. The supply portion 10 is, for example, an automatic charge portion for continuously charging the raw material into the coarse crushing portion 12. The raw material supplied by the supply portion 10 contains, for example, fiber such as waste paper and pulp sheets.

The coarse crushing portion 12 subdivides the raw material supplied by the supply portion 10 into small pieces in gas, such as air. Regarding the shape and the size of the small pieces, for example, a small piece is a square several centimeters per side. In the present embodiment, the coarse crushing portion 12 includes a coarse crushing blade 14, and the charged raw material can be subdivided by the coarse crushing blade 14. For example, a shredder is used as the coarse crushing portion 12. The raw material subdivided by the coarse crushing portion 12 is received by a hopper 1 and transferred to the defibration portion 20 through a pipe 2.

The defibration portion 20 defibers the raw material cut by the coarse crushing portion 12. Herein, "defiber" denotes disentangling, into individual fibers, the raw material in which a plurality of fibers are bound. The defibration portion 20 also has a function of separating substances, such as a resin particle, an ink, a toner, and a bleeding inhibitor, attached to the raw material from the fiber.

A material passed through the defibration portion 20 is denoted as "defibered material". The "defibered material" may contain, in addition to the disentangled defibered fiber, a resin particle, a coloring agent such as an ink or a toner, an additive such as a bleeding inhibitor, and a paper strength additive, which are separated from the fiber during entanglement of the fiber. The shape of the disentangled defibered material is stringlike. The disentangled defibered material may be present in the state of not being entangled with other disentangled fiber, that is, in the state of being independent, or may be present in a cluster state due to being entangled with other disentangled defibered material, that is, in a state of forming a clump.

The defibration portion 20 performs defibration in a dry system. Herein, performing defibration treatment and the like not in a liquid but in a gas, such as air, is denoted as a dry system. For example, an impeller mill is used as the defibration portion 20. The defibration portion 20 has a function of generating a gas stream which suctions the raw material and which discharges the defibered material. Consequently, the defibration portion 20 can suction the raw material with the gas stream from an inlet 22, perform defibration treatment, and transport the defibered material to an outlet 24 by using the gas stream generated by just the defibration portion 20. The defibered material passed through the defibration portion 20 is transferred to the sorting portion 40 through a pipe 3. In this regard, regarding the gas stream for transporting the defibered material from the defibration portion 20 to the sorting portion 40, the gas stream generated by the defibration portion 20 may be exploited, or a gas stream generator such as a blower may be disposed and the resulting gas stream may be exploited.

The sorting portion 40 introduces the defibered material defibered by the defibration portion 20 from an inlet 42 and performs sorting in accordance with the length of the fiber. The sorting portion 40 includes, for example, a drum portion 41 and a housing portion 43 for housing the drum portion 41. For example, a sieve is used as the drum portion 41. The drum portion 41 includes a mesh and can separate fibers or particles smaller than the size of the mesh openings, that is, a first sorted material that passes through the mesh, from fibers, pieces which are not defibered, and clumps larger than the size of the mesh openings, that is, a second sorted material that does not pass through the mesh. For example, the first sorted material is transferred to the accumulating portion 60 through a pipe 7. The second sorted material is returned to the defibration portion 20 from the outlet 44 through a pipe 8. Specifically, the drum portion 41 is a cylindrical sieve driven by a motor to rotate. Examples of the mesh of the drum portion 41 include metal meshes, expanded metals which are produced by expanding a metal plate having slits, and perforated metals which are metal plates in which holes are formed by a press machine or the like.

The first web forming portion 45 transports the first sorted material passed through the sorting portion 40 to a pipe 7. The first web forming portion 45 includes, for example, a mesh belt 46, stretching rollers 47, and a suction mechanism 48.

The suction mechanism 48 can suction the first sorted material, which is passed through the openings of the sorting portion 40 and which is dispersed in air, onto the mesh belt 46. The first sorted material is accumulated on the moving mesh belt 46 so as to form a web V. The basic configuration of the mesh belt 46, the stretching rollers 47, and the suction mechanism 48 is akin to that of a mesh belt 72, stretching rollers 74, and a suction mechanism 76 of the second web forming portion 70 described later.

The web V is formed so as to take on a state of containing a large amount of air and being caused to gently swell by being passed through the sorting portion 40 and the first web forming portion 45. The web V accumulated on the mesh belt 46 is placed in the pipe 7 and transported to the accumulating portion 60.

The rotator 49 can cut the web V. In the present embodiment, the rotator 49 includes a base portion 49a and a protrusion portion 49b protruded from the base portion 49a. The protrusion portion 49b has, for example, a plate-like shape. In the present embodiment, four protrusion portions 49b are disposed equidistantly. The base portion 49a rotating in the direction R enables the protrusion portions 49b to rotate about the base portion 49a serving as a shaft. The web V being cut by the rotator 49 enables, for example, a fluctuation in the rate of supplying the defibered material to the accumulating portion 60 to be reduced.

The rotator 49 is disposed in the vicinity of the first web forming portion 45. In the present embodiment, the rotator 49 is disposed in the vicinity of a stretching roller 47a located downstream in the passage of the web V. The rotator 49 is disposed at a position at which the protrusion portions 49b can be in contact with the web V and at which the protrusion portions 49b are not in contact with the mesh belt 46 for accumulating the web V thereon. Consequently, the mesh belt 46 can be suppressed from being abraded by the protrusion portions 49b. The minimum distance between the protrusion portions 49b and the mesh belt 46 is, for example, 0.05 mm or more and 0.5 mm or less. This is a distance at which the web V can be cut without damaging the mesh belt 46.

The mixing portion 50 mixes, for example, the first sorted material passed through the sorting portion 40 with an additive. The mixing portion 50 includes, for example, an additive supply portion 52 for supplying the additive, a pipe 54 for transporting the first sorted material and the additive, and a blower 56. In the present embodiment, the additive is supplied from the additive supply portion 52 to the pipe 54 through a hopper 9. The pipe 54 is in communication with the pipe 7.

In the mixing portion 50, a gas stream is generated by the blower 56, and the first sorted material and the additive can be mixed and transported in the pipe 54. In this regard, there is no particular limitation regarding the mechanism for mixing the first sorted material and the additive. Agitation may be performed using an impeller rotating at a high speed, or rotation of a container may be exploited in a way similar to a V-type mixer.

Regarding the additive supply portion 52, a screw feeder illustrated in FIG. 1, a disk feeder not illustrated in the drawing, or the like is used.

There is no particular limitation regarding the additive supplied from the additive supply portion 52, and, for example, a material for binding a plurality of fibers may be included. In addition, when the sheet producing method according to the present embodiment is applied, the additive contains starch or dextrin. Starch and dextrin will be described later.

In this regard, the additive supplied from the additive supply portion 52 may include a coloring agent for coloring the fiber, a flocculation inhibitor for suppressing the fiber from being flocculated and suppressing the additive from being flocculated, and a flame retardant for suppressing the fiber and the like from readily burning in accordance with the type of the sheet to be produced. Alternatively, when a sheet is produced without using an additive, the mixing portion 50 is not limited to being disposed. The mixture passed through the mixing portion 50 is transferred to the accumulating portion 60 through the pipe 54.

In the accumulating portion 60, the mixture passed through the mixing portion 50 is introduced from an inlet 62, and entangled defibered material is disentangled and dropped in air while being dispersed. Consequently, the accumulating portion 60 can uniformly accumulate the mixture on the second web forming portion 70.

The accumulating portion 60 includes, for example, a drum portion 61 and a housing portion 63 for housing the drum portion 61. A cylindrical sieve that rotates is used as the drum portion 61. The drum portion 61 includes a mesh and drops fibers or particles which are contained in the mixture passed through the mixing portion 50 and which are smaller than the size of the mesh openings. The configuration of the drum portion 61 is akin to, for example, the configuration of the drum portion 41.

In this regard, the "sieve" in the drum portion 61 is not limited to having a function of sorting a specific object. That is, the "sieve" used as the drum portion 61 denotes a material including a mesh, and the drum portion 61 may drop all the mixture introduced into the drum portion 61.

The second web forming portion 70 accumulates materials passed through the accumulating portion 60 so as to form a web W. The second web forming portion 70 includes, for example, a mesh belt 72, stretching rollers 74, and a suction mechanism 76.

The materials passed through the openings of the accumulating portion 60 are accumulated on the mesh belt 72. The mesh belt 72 is looped around the stretching rollers 74 and is configured to allow air to pass through but restrict the materials passed through the accumulating portion 60 from passing through. The mesh belt 72 moves due to the stretching rollers 74 rotating. The web W is formed on the mesh belt 72 due to the mesh belt 72 being continuously moved and the materials passed through the accumulating portion 60 being dropped and accumulated thereon.

The suction mechanism 76 is disposed below the mesh belt 72. The suction mechanism 76 can generate a downward gas stream. The mixture dispersed in air by the accumulating portion 60 can be suctioned onto the mesh belt 72 by the suction mechanism 76. Consequently, the discharge speed from the accumulating portion 60 can be increased. Further, a downflow can be formed in the dropping passage of the mixture by the suction mechanism 76, and the defibered material and the additive can be prevented from being entangled during dropping.

As described above, the web W is formed so as to take on a state of containing a large amount of air and being caused to gently swell by being passed through the accumulating portion 60 and the second web forming portion 70.

The accumulated web W is provided with water while being transported to the sheet forming portion 80. The water is provided by a water providing portion 78. The water providing portion 78 provides water so that the web W has a predetermined water content. The water providing portion 78 may be composed of, for example, a steam dispenser, a mist dispenser, a shower, an ink jet, or the like. Of these, the water providing portion 78 may provide the web W with water by using steam or mist from the viewpoint of being capable of favorably and uniformly providing the web W with water.

In this regard, in the present embodiment, a suction mechanism 79 is disposed at a position opposing the water providing portion 78 with the web W interposed therebetween. The suction mechanism 79 can generate a downward gas stream. The water generated from the water providing portion 78 can be suctioned through the web W by the suction mechanism 79. Consequently, the water can be more uniformly provided in the thickness direction of the web W. In this regard, in the present embodiment, the web W on the mesh belt 72 is provided with water from the water providing portion 78. However, the water providing portion 78 is not limited to being disposed above the mesh belt 72 but has to be disposed upstream of the position at which the web W is transported to the sheet forming portion 80.

The web W provided with water from the water providing portion 78 is transported to the sheet forming portion 80.

The sheet forming portion 80 compresses and heats the web W accumulated on the mesh belt 72 so as to form a sheet S. In the sheet forming portion 80, heat and pressure are applied to the mixture of the defibered material and the additive which has been mixed, accumulated, and provided with water. In the sheet forming portion 80, the water is vaporized after the temperature is increased, and the thickness of the web W is reduced so as to increase the density.

The temperature of the water and starch or dextrin is increased due to the heat, the density is increased due to the pressure, and the starch or dextrin is thereby gelatinized. Thereafter, a plurality of fibers are entangled and bound with the gelatinized starch or dextrin interposed therebetween due to the water being vaporized. Consequently, the sheet S having favorable mechanical strength can be formed. Further, the water being vaporized due to the heat and the density being increased due to the pressure cause hydrogen bonds to form between a plurality of fibers. Consequently, the sheet S having more favorable mechanical strength can be formed.

The sheet forming portion 80 includes a compression-heating portion 84 for compression-heating the web W. The compression-heating portion 84 is formed using, for example, a compression-heating roller. In the present embodiment, the compression-heating portion 84 is formed using a pair of compression-heating rollers 86. In this regard, there is no particular limitation regarding the number of the compression-heating rollers 86. The web W can be simultaneously compressed and heated by the compression-heating portion 84.

The cutting portion 90 cuts the sheet S formed by the sheet forming portion 80. In the present embodiment, the cutting portion 90 includes a first cutting portion 92 for cutting the sheet S in the direction intersecting the transportation direction of the sheet S and a second cutting portion 94 for cutting the sheet S in the transportation direction of the sheet S. The second cutting portion 94 cuts the sheet S passed through, for example, the first cutting portion 92.

As a result, a single sheet of the sheet S having a predetermined size is formed. A cut single sheet of the sheet S is discharged to a discharge-receiving portion 96.

1-2. Sheet Producing Method

Figure 2:
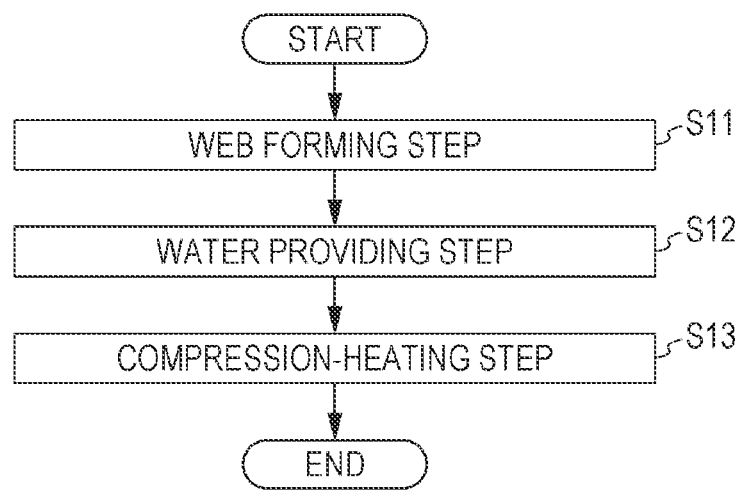
FIG. 2 is a flow chart illustrating a sheet producing method.

FIG. 2 is a flow chart illustrating a sheet producing method.

The sheet producing method according to the present embodiment will be described with reference to FIG. 2.

The sheet producing method according to the present embodiment can be performed using, for example, the above-described sheet producing apparatus 100. Hereafter, the sheet producing method performed using the sheet producing apparatus 100 will be described. The sheet S produced using the sheet producing apparatus 100 is a sheet containing at least the fiber and, in the present embodiment, starch or dextrin.

In this regard, in the web forming step, the starch or dextrin is not limited to being contained in the web W. In such an instance, in the compression-heating step described later, the sheet S is formed through hydrogen bonding between fibers.

As illustrated in FIG. 2, the sheet producing method according to the present embodiment includes the web forming step (step S11), the water providing step (step S12), and the compression-heating step (step S13). In this regard, in the web forming step (step S11), a web is formed by accumulating a mixture containing the fiber and the starch or dextrin in a dry system. In the water providing step (step S12), the web W is provided with water. In the compression-heating step (step S13), the web W provided with water is compressed and heated.

1-2-1. Fiber

There is no particular limitation regarding the fiber, and a wide range of fiber materials can be used. Examples of the fiber include natural fiber (animal fiber and plant fiber) and chemical fiber (organic fiber, inorganic fiber, and organic-inorganic composite fiber). More specific examples of the fiber include cellulose, silk, wool, cotton, hemp, kenaf, flax, ramie, jute, Manila hemp, sisal, and fibers composed of hardwood, softwood, and the like. In this regard, such fibers may be used alone, may be used in appropriate combination, or may be used as recycled fiber after being refined or the like.

Examples of the raw material for the fiber include pulp, waste paper, and waste cloth. In this regard, the fiber may be subjected to various surface treatments. The material of the fiber may be a pure substance or a material containing a plurality of components such as impurities and other components. In addition, regarding the fiber, a defibered material which is produced by defibering waste paper, pulp sheets, or the like in a dry system may be used.

There is no particular limitation regarding the fiber length, and the length of an independent single fiber in the longitudinal direction is preferably 1 µm or more and 5 mm or less, more preferably 2 µm or more and 3 mm or less, and further preferably 3 µm or more and 2 mm or less.

Since the sheet producing method according to the present invention includes the water providing step (step S12), using the fiber capable of forming hydrogen bonds enables the mechanical strength of the resulting sheet S to be enhanced. Examples of such fiber include cellulose.

The content of the fiber in the sheet S is set to be preferably 50% by mass or more and 99.9% by mass or less, more preferably 60% by mass or more and 99% by mass or less, and further preferably 70% by mass or more and 99% by mass or less. Such a content can be ensured by adjusting the combination when the mixture is formed.

1-2-2. Starch and Dextrin

Starch and dextrin are water-soluble polysaccharides which may be dissolved in water, hot water, or boiling water. Starch is a polymer in which a plurality of α-glucose molecules are polymerized through glucoside bonds. Starch may exist in the form of straight chains or may branch. Various plant-derived materials may be used as the starch. Examples of the raw material for the starch include grains, such as corn, wheat, and rice, beans, such as broad beans, mung beans, and adzuki beans, corms, such as potato, sweet potato, and tapioca, wild grasses, such as dogtooth violet, bracken, and vine, and palms such as sago palm.

In addition, processed starch or modified starch may be used as the starch. Examples of the processed starch include acetylated distarch adipate, acetylated starch, oxidized starch, starch sodium octenylsuccinate, hydroxypropyl starch, hydroxypropyl distarch phosphate, phosphorylated starch, phosphated distarch phosphate, starch urea phosphate, sodium starch glycolate, and high-amylose corn-starch. Examples of the modified starch include gelatinized starch, dextrin, lauryl polyglucose, cationized starch, thermoplastic starch, and starch carbamate. In this regard, dextrin obtained by processing or modifying starch can be favorably used.

In the sheet producing method, starch or dextrin being used and compression-heating being performed after water is provided enable the sheet S to have sufficient strength since at least one of gelatinization of starch or dextrin and hydrogen bonding between fibers occurs.

The content of the starch or dextrin in the sheet S is set to be preferably 0.1% by mass or more and 50% by mass or less, more preferably 1% by mass or more and 40% by mass or less, and further preferably 1% by mass or more and 30% by mass or less. Such a content can be ensured by adjusting the combination when the mixture is formed.

1-2-3. Web Forming Step

In the web forming step (step S11), a web is formed by accumulating a mixture containing the fiber and, in the present embodiment, starch or dextrin in a dry system. The fiber is a defibered material defibered by the defibration portion 20, the starch or dextrin is supplied from the additive supply portion 52, and the mixture is formed by the mixing portion 50. Subsequently, the web W can be formed by the accumulating portion 60 and the second web forming portion 70 accumulating the mixture in a dry system.

1-2-4. Water Providing Step

In the water providing step (step S12), the web W formed in the web forming step is provided with water. In the present embodiment, the web W can be provided with water by the water providing portion 78.

The amount of water provided in the water providing step can be controlled in accordance with the water content of the web W. The water content of the web W provided with water in the water providing step is set to be preferably 12% by mass or more and 50% by mass or less, more preferably 13% by mass or more and 40% by mass or less, and further preferably 14% by mass or more and 25% by mass or less. Providing such an amount of water enables the amount of energy, such as electric power, required for heat-drying the web W to be reduced and enables the sheet S having more excellent strength to be produced.

In this regard, in the water providing step, the web W may be provided with steam or mist. Consequently, the web W can be more uniformly provided with water, and the sheet S can be produced with a simpler apparatus configuration.

1-2-5. Compression-Heating Step

In the compression-heating step (step S13), the web W provided with water in the water providing step is compressed and simultaneously heated from the outside (surface) of the web W. In the compression-heating step, compression and heating are simultaneously performed. In the present embodiment, the compression-heating step is performed by the sheet forming portion 80.

As described above, the sheet forming portion 80 includes a pair of compression-heating rollers 86 as the compression-heating portion 84. In the sheet forming portion 80 (compression-heating portion 84), the sheet S is formed by compressing and heating the web W due to the web W that is accumulated on the mesh belt 72 and provided with water by the water providing portion 78 so as to have a predetermined water content being nipped between the rotating pair of compression-heating rollers 86.

The compression-heating step reduces the thickness of the web W after the compression-heating step compared with that before the compression-heating step and enhances the density of the web W by compressing the web W so that a predetermined compression degree is ensured.

The compression degree denotes a ratio of compression before and after the compression-heating step. The compression degree is represented by Formula (1) below. In this regard, in the present embodiment, the compression degree is expressed as a fraction.

$$\text{compression degree} = \text{thickness of web after compression-heating step}/\text{thickness of web before compression-heating step} \quad (1)$$

Herein, "thickness of web before compression-heating step" corresponds to "before" as in "before and after the compression-heating step" and denotes the thickness of the web W immediately after being provided with water in the water providing portion 78 of the sheet producing apparatus 100. In addition, "thickness of web after compression-heating step" corresponds to "after" as in "before and after the compression-heating step" and denotes the thickness of the web W immediately after being compression-heated in the compression-heating portion 84 of the sheet producing apparatus 100.

In the present embodiment, compression is performed so that the compression degree is set to be preferably $\frac{1}{18}$ or more and $\frac{1}{7}$ or less, more preferably $\frac{1}{18}$ or more and $\frac{1}{10}$ or less, and further preferably $\frac{1}{16}$ or more and $\frac{1}{12}$ or less. In this regard, "or more" and "or less" express the magnitude of a fraction. In the present specification, the compression degree may be expressed as "high" or "low", it should be noted that a fraction decreases with increasing compression degree, and a fraction increases with decreasing compression degree. The compression degree can be adjusted by adjusting the nip pressure of the compression-heating rollers 86.

Since compressing the web W in such a compression degree range enables the sheet S having favorable strength to be produced and enables the fiber to be suppressed from deteriorating, a sheet S having favorable strength can be reproduced using the initially produced sheet S as a raw material.

The compression-heating step can form hydrogen bonds between fibers by heating the web W to a predetermined temperature so as to provide the sheet S with sufficient strength.

The pair of compression-heating rollers 86 each include a heating member (not illustrated in the drawing) such as a halogen heater in the central portion, and the surface temperature of the compression-heating rollers 86 can be maintained at a predetermined temperature. Therefore, in the present embodiment, the compression-heating rollers 86 heat the web W from the outside (surface) of the web W so as to vaporize water contained in the web W.

The heating temperature of the web W in the compression-heating step in the present embodiment is 100° C. or lower. In the compression-heating step, the web W is heated so that the heating temperature of the web W is set to be preferably 60° C. or higher and 100° C. or lower, more preferably 65° C. or higher and 98° C. or lower, and further preferably 70° C. or higher and 96° C. or lower. The heating temperature can be adjusted by adjusting the driving voltage of the heating member of the compression-heating rollers 86.

Heating the web W at a heating temperature within such a range enables hydrogen bonds between fibers to be more effectively formed. In addition, when starch or dextrin is contained in the web W, the starch or dextrin facilitates gelatinization, and a plurality of fibers can be bonded with the starch or dextrin gelatinized due to water being vaporized interposed therebetween. Consequently, the sheet S can be provided with sufficient strength.

Compression-heating is performed while the lower limit value of the compression-heating time during compression-heating is set to be preferably 0.5 sec or more, more preferably 0.6 sec or more, and further preferably 0.8 sec or more. In addition, compression-heating is performed while the upper limit value of the compression-heating time is set to be preferably 10 sec or less, more preferably 8 sec or less, and further preferably 6 sec or less.

In this regard, the compression-heating time denotes an elapsed time from the moment at which any portion of the web W comes into contact with the compression-heating roller 86 to the moment at which the above-described portion of the web W leaves the compression-heating roller 86. The compression-heating time can be adjusted by adjusting the rotational speed of the compression-heating roller 86. Compression-heating the web W at a compression-heating time within such a range enables productivity to be improved. In addition, water can be made to sufficiently and uniformly permeate the web such that the quality of the repeatedly recycled sheet S is further improved.

In the present embodiment, the compression-heating portion 84 being composed of the compression-heating rollers 86 enables the sheet S to be formed while the web W is continuously transported compared with when the compression-heating portion 84 is composed of a flat plate press apparatus. In this regard, when the flat plate press apparatus is used, a buffer portion in which the transported web W is made to temporarily sag is necessary during pressing. That is, use of the compression-heating rollers 86 enables the production efficiency to be increased and enables the configuration of the entire sheet producing apparatus 100 to be downsized compared with when the flat plate press apparatus is used.

1.2.6. Other Steps

The sheet producing method according to the present embodiment may include, in addition to the steps above, for example, a defibering step, a sorting step, and a cutting step. These steps can be readily performed using the sheet producing apparatus 100 above, that is, using the defibration portion 20, the sorting portion 40, the first web forming portion 45, the rotator 49, the cutting portion 90, and the like.

1-3. Operation and Advantages

The sheet producing method according to the present embodiment includes the web forming step of forming the web W by accumulating the fiber in a dry system, the water providing step of providing the web W with water, and the compression-heating step of compressing and simultaneously externally heating the web W provided with water. In this regard, the water content of the web W provided with water in the water providing step is 12% by mass or more, and the compression degree of the web W between before and after the compression-heating step is $\frac{1}{7}$ or less.

Consequently, regarding the sheet producing method according to the present embodiment, compressing the web W provided with water increases the density of the web W and causes the provided water to permeate the interior of the web W in the thickness direction. In such an instance, the compression degree being 1/7 or less enables the water to sufficiently permeate the web W throughout in the thickness direction. As a result, the hydrogen bonds between fibers can be formed throughout the web W in the thickness direction, and the sheet S has excellent strength.

When the web W is compressed so that the compression degree is set to be 1/7 or less, the water content of the web W being 12% by mass or more enables the fiber to become flexible and enables the pressure required for compression to be reduced. As a result, the producing method becomes simpler, and, in addition, the fiber can be suppressed from deteriorating during compression. The fiber being suppressed from deteriorating causes the sheet S to have excellent strength even when the sheet S is reproduced using, as the raw material, the fiber obtained by defibering the initially produced sheet S.

When the web W having a water content of 12% by mass or more is compressed so that the compression degree is set to be 1/7 or less, simultaneously heating the web W enables the water to permeate the interior of the web W in the thickness direction and enables the web W to be dried so as to facilitate formation of the hydrogen bonds. In this regard, the web W having a water content of 12% by mass or more tends to be broken and to adhere to a member in contact with the web W. However, heating such a web W from the outside (surface) during compression enables the water on the web W surface to be dried and enables compression to be performed while the web W is suppressed from adhering to the compression member (compression-heating rollers 86).

In the sheet producing method according to the present embodiment, the compression degree of the web W between before and after the compression-heating step being 1/18 or more enables the fiber to be further suppressed from deteriorating during compression.

In the sheet producing method according to the present embodiment, the water content of the web W provided with water being 40% by mass or less enables the water content of the web W to be suppressed from becoming nonuniform due to the water being squeezed out when compression is performed so that the compression degree is set to be 1/7 or less.

In the sheet producing method according to the present embodiment, the heating temperature of the web W in the compression-heating step being 60° C. or higher and 100° C. or lower enables the hydrogen bonds between fibers to be more effectively formed and enables the sheet S to have sufficient strength.

In the sheet producing method according to the present embodiment, the compression-heating time in the compression-heating step being 0.5 sec or more enables the water to sufficiently permeate the web W. As a result, the quality when repeated recycling is performed is further improved, and the strength of the sheet S can be further enhanced.

In the sheet producing method according to the present embodiment, the web W containing starch or dextrin enables the strength of the sheet S to be further enhanced.

The sheet producing apparatus 100 according to the present embodiment includes the web forming portion (second web forming portion 70) for forming the web W by accumulating the fiber in a dry system, the water providing portion 78 for providing the web W with water, and the compression-heating portion 84 for compressing and simultaneously externally heating the web W provided with water. In this regard, in the sheet producing apparatus 100, the water content of the web W provided with water in the water providing portion 78 is 12% by mass or more, and the compression degree of the web W between before and after the compression-heating portion 84 is 1/7 or less.

Consequently, according to the sheet producing apparatus 100 of the present embodiment, the fiber can be suppressed from deteriorating during compression by the compression-heating portion 84. Therefore, the sheet S having excellent strength and being suitable for repeated recycling can be produced.

1-4. EXAMPLES AND COMPARATIVE EXAMPLES

The present disclosure will be specifically described below with reference to the examples, but the present disclosure is not limited to these examples.

1-4-1. Formation of Sheet

FIG. 3 is a diagram illustrating a sheet forming condition and evaluation results.

FIG. 3 illustrates the forming condition and the evaluation results when an apparatus corresponding to the above-described sheet producing apparatus 100 was used and the sheet was produced while the forming condition was changed. Regarding the formation of the sheet, a web was formed by accumulating a defibered material in a dry system, the web was provided with water, and the web provided with water was compression-heated by a pair of compression-heating rollers so as to produce a sheet. In this regard, compression and heating of the web were performed simultaneously.

As illustrated in FIG. 3, regarding the forming condition, the amount of water provided (water content), the compression degree of the web, and the compression time were changed. Regarding the formation condition for Sample No. 10, starch was used as the binder. However, regarding other samples, a binder such as a resin, starch, dextrin, or the like was not used. Regarding all the samples, the basis weight was about 85 g/m², and the sheet temperature was about 85° C. In this regard, the amount of water (water content) was measured using an "MX-50" produced by A&D.

The thickness A is a thickness of the web before the compression-heating step, and the thickness B is a thickness of the web after the compression-heating step. Therefore, the compression degree was calculated based on Formula (1) above.

1-4-2. Evaluation Condition

Regarding the sheet formed as described above, the strength, the density, dripping of water during compression, and repeated recycling were evaluated.

1-4-2-1. Strength

In the present example, the strength denotes the specific tensile strength. A sheet piece of 10 mm wide×50 mm long was cut from the resulting sheet, and the specific tensile strength was calculated based on Formula (2) below. The tensile strength was evaluated based on a tensile test. An "AGS-X500N" produced by SHIMADZU CORPORATION was used as the test apparatus. The pulling rate was set to be 1 mm/s.

$$\text{specific tensile strength (N·m/g)} = \text{maximum tensile load (N)/test piece width (mm)/test piece basis weight (g/cm}^2\text{)} \quad (2)$$

The evaluation criteria of the specific tensile strength (N·m/g) was as described below.

A: 12 or more, B: 8 or more and less than 12, and C: less than 8

1-4-2-2. Density

In the present example, a sheet piece of 30 mm wide×200 mm long was cut from the resulting sheet, the thickness and the mass of the test piece were measured, and the density was calculated based on Formula (3) below. Regarding the thickness, measurement was performed using a micrometer at five equidistant positions in the longitudinal direction of the resulting test piece, and an average value was calculated.

$$\text{density}=\text{mass}/(\text{thickness}\times 3\times 20) \quad (3)$$

The evaluation criteria of the density (g/cm$^3$) was as described below.

A: 0.6 or more, B: 0.45 or more and less than 0.6, and C: less than 0.45

1-4-2-3. Dripping of Water During Compression

In the present example, dripping of water during compression was visually assessed during compression.

The evaluation criteria of dripping of water during compression was as described below.

A: no dripping occurred and B: dripping occurred

1-4-2-4. Repeated Recycling

In the present example, regarding repeated recycling, papermaking was performed using recycled paper which had been subjected to papermaking as a raw material, this was repeated twice, and the strength was measured. That is, papermaking was performed three times in total. The method for measuring the strength of the repeatedly recycled sheet was as described above. The strength ratio of a third recycle RC3 to a first recycle RC1 (strength of third recycle RC3/strength of first recycle RC1) was determined. In the description hereafter, the first recycle is abbreviated as RC1, and the third recycle is abbreviated as RC3.

The evaluation criteria of repeated recycling was as described below.

A: ratio was 0.9 or more, B: ratio was 0.8 or more and less than 0.9, and C: ratio was less than 0.8

However, even when the ratio was "A" or "B", the rating was "poor" when the strength of RC1 was "C" (in the comparative example, expression was "A'" or "B'", and the rating was "poor").

1-4-3. Evaluation Result

FIG. 3 illustrates the evaluation results of the sheets of Sample Nos. 1 to 10. The sheets of Nos. 1, 4, 5, 7, 8, 9, and 10 are sheets according to the examples. The sheets of Nos. 2, 3, and 6 are sheets according to the comparative examples.

As illustrated in FIG. 3, the sheet of No. 1 was favorable since the water content and the compression degree were appropriate and since the strength was "B" and the density was "B". Since the compression degree was, more favorably, lower than that of No. 5, dripping of water during compression was "A" and the strength ratio of repeated recycling was "A".

Regarding the sheet of No. 2, the compression degree was a low value of ⅕, water did not permeate throughout in the thickness direction, and the density was "C" and was low. Consequently, the strength was "C" and was low. Dripping of water during compression was "A". The strength ratio of repeated recycling was "B'" and was favorable, but the strength of RC3 was low in a manner similar to that of RC1 (the strength of RC1 was "C").

The sheet of No. 3 had a thickness A of 800 μm whereas the thickness A of other samples was 1,800 μm. This is because water was provided after the sheet was slightly compressed in advance. The final density was "B" and was favorable, but the compression degree after water was provided was a low value of ⅕ such that water did not permeate throughout in the thickness direction. The density was "B" and was favorable due to compression being performed twice, but since water did not permeate throughout, the strength was "C" and was low. Dripping of water during compression was "A". The strength ratio of repeated recycling was "B'" and was favorable, but the strength of RC3 was low in a manner similar to that of RC1 (the strength of RC1 was "C").

Regarding the sheet of No. 4, the compression degree was a somewhat high value of ¹⁄₁₆, and higher density and strength were obtained compared with Sample No. 1. All the evaluation items were "A" and were very favorable, and the evaluation results were favorable compared with the sheets of Nos. 1, 5, 6, and 8 to 10.

Regarding the sheet of No. 5, the water content was appropriate, the compression degree was somewhat high, a necessary amount of water permeated throughout in the thickness direction, the fiber was sufficiently flexible, all of the strength, the density, and the dripping of water during compression were "A" and were very favorable, and the strength ratio of repeated recycling was "B" and was favorable.

Regarding the sheet of No. 6, the same pressure as the pressure for No. 1 was applied, but the water content was 10% by mass and was insufficient such that water did not permeate throughout in the thickness direction and such that the strength was "C" and was low. The strength ratio of repeated recycling was "B'" and was favorable, but the strength of RC3 was low in a manner similar to that of RC1 (the strength of RC1 was "C").

Regarding the sheet of No. 7, the same pressure as the pressure for No. 1 was applied, but since the water content was 30% by mass and was somewhat high, the compression degree was somewhat high compared with No. 1 such that higher density and strength than those of No. 1 were obtained. Specifically, all the evaluation items were "A" and the evaluation results were very favorable.

Regarding the sheet of No. 8, dripping of water during compression was "B", and the evaluation was poor due to dripping of water during compression. The other evaluation results were favorable. The same pressure as the pressure for No. 1 was applied, but since the water content was 50% by mass and was somewhat high, the compression degree was somewhat high compared with No. 1 such that the density "A" and the strength "A" higher than those of No. 1 were obtained and were favorable. In addition, the strength ratio of repeated recycling was also "A" and was favorable.

Regarding the sheet of No. 9, since the compression time was 0.3 sec and was somewhat short compared with the other samples, the uniformity of water content in the thickness direction was somewhat poor, and the strength ratio of repeated recycling was somewhat poor. Specifically, all of the strength, the density, and the strength ratio of repeated recycling were "B" and were favorable, and dripping of water during compression was "A".

Regarding the sheet of No. 10, since starch was used as the binder, the strength was improved to "A" compared with No. 1. Specifically, the density was "B", and both dripping of water during compression and the strength ratio of repeated recycling were "A".

2. Second Embodiment

The sheet producing method according to the present embodiment is essentially akin to the sheet producing method according to the first embodiment. Regarding the sheet producing method according to the present embodiment, the configuration of a sheet forming portion 30 in a sheet producing apparatus 100A (each refer to FIG. 4) when the compression-heating step is performed differs from the configuration of the sheet forming portion 80 in the first embodiment. In addition, since the different sheet forming portion 30 was adopted, the configuration of the upstream and the downstream in the transportation direction are somewhat changed. Therefore, the configuration of the sheet producing apparatus 100A which is an example for performing the sheet producing method according to the present embodiment different from the configuration of the sheet producing apparatus 100 in the first embodiment will be mainly described.

2.1. Sheet Producing Apparatus

Figure 4:
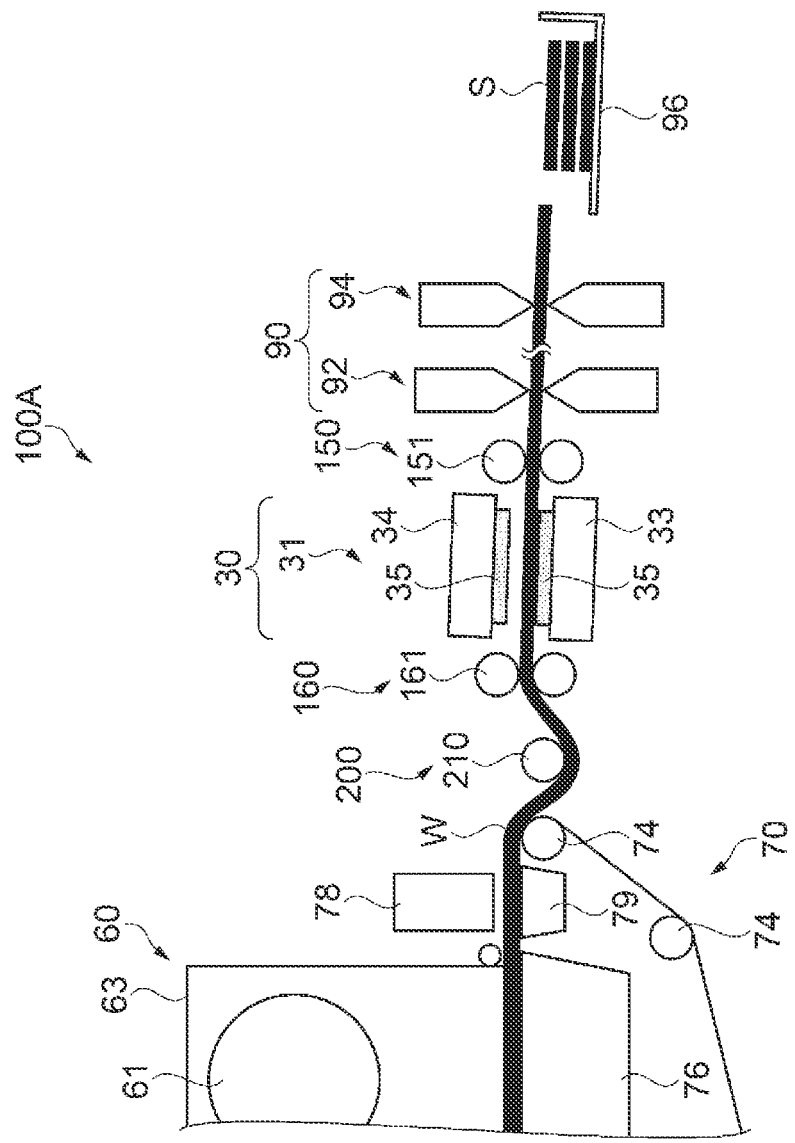
FIG. 4 is a schematic diagram illustrating a sheet producing apparatus according to a second embodiment.

FIG. 4 is a schematic diagram illustrating the sheet producing apparatus 100A according to the present embodiment.

In FIG. 4, the configuration downstream of the accumulating portion 60 is illustrated to describe a portion different from the sheet producing apparatus 100 in the first embodiment.

The sheet producing apparatus 100A according to the present embodiment will be described below with reference to FIG. 4A.

The sheet producing apparatus 100A according to the present embodiment differs from the sheet producing apparatus 100 in the first embodiment in the configuration of the sheet forming portion 30 (compression-heating portion 31) as described above. In the sheet producing apparatus 100A according to the present embodiment, the sheet forming portion 30 is disposed downstream of a second web forming portion 70 and a water providing portion 78. The sheet forming portion 30 produces a sheet S by nipping a web W formed in the second web forming portion 70 and provided with water in the water providing portion 78 with a flat-plate pressing apparatus and by performing compression-heating.

The sheet forming portion 30 includes the compression-heating portion 31 serving as the flat-plate pressing apparatus for compression-heating the web W. In the present embodiment, the compression-heating portion 31 includes a lower mold portion 33 and an upper mold portion 34 arranged opposing each other. A flat plate 35 composed of a metal such as aluminum or copper is disposed on each of opposing surfaces of the lower mold portion 33 and the upper mold portion 34. The flat plate 35 is provided with, for example, a mica-heater and is configured to be capable of being heated to a predetermined temperature. The lower mold portion 33 and the upper mold portion 34 are relatively moved using arbitrary pressing mechanism, such as a hydraulic press, an air press, or a mechanical press, and the web W is nipped between the lower mold portion 33 and the upper mold portion 34 so as to be compression-heated.

2-2. Sheet Producing Method

The sheet producing method according to the present embodiment is akin to the sheet producing method according to the first embodiment. There is a difference in the specific method of the compression-heating step, that is, the compression-heating portion 31 according to the present embodiment is used.

2-2-1. Compression-Heating Step

In the compression-heating step, the web W provided with water in the water providing step is compressed and simultaneously heated from the outside (surface) in the manner akin to that in the first embodiment. In the compression-heating step, compression and heating are simultaneously performed by the sheet forming portion 30.

As described above, the sheet forming portion 30 includes the lower mold portion 33 and the upper mold portion 34 as the compression-heating portion 31. In the compression-heating portion 31 according to the present embodiment, the upper mold portion 34 is configured to vertically move with respect to the lower mold portion 33. In the sheet forming portion 30 (compression-heating portion 31), the web W accumulated on the mesh belt 72 and provided with water by the water providing portion 78 so as to have a predetermined water content is nipped between the lower mold portion 33 and the upper mold portion 34, and the web W is compression-heated with a predetermined compression degree at a predetermined heating temperature for a predetermined compression-heating time. Therefore, the compression-heating portion 31 heats the web W from the outside (surface) of the web W.

Regarding the heating device of the compression-heating portion 31, a mica-heater or any other heating member, such as an oil heater or a sheathed heater, may be used. As the situation demands, the surface of the flat plate 35 may be configured to be wrapped with a Teflon (registered trademark) sheet. In such an instance, when the web W is compression-heated, for example, melted resin fiber can be suppressed from adhering to the flat plate 35 so as to prevent the web W from being damaged. In the compression-heating step, the compression degree, the heating temperature, the compression-heating time, and the like in the compression-heating portion 31 are akin to those in the first embodiment.

In this regard, the compression degree is represented by Formula (1) in a way similar to that in the first embodiment. "Thickness of web W before compression-heating step" denotes the thickness of the web W immediately after water is provided by the water providing portion 78 in the sheet producing apparatus 100A. "Thickness of web W after compression-heating step" denotes the thickness of the web W immediately after being compression-heated by the compression-heating portion 31 in the sheet producing apparatus 100A.

In addition, the compression-heating time in the compression-heating portion 31 denotes an elapsed time from the moment at which a region of the web W to be compression-heated is moved to the position between the lower mold portion 33 and the upper mold portion 34 and the web W is nipped between (comes into contact with) the lower mold portion 33 and the upper mold portion 34 to the moment at which the web W leaves the lower mold portion 33 and the upper mold portion 34.

2-2-2. Other Different Configurations

The sheet producing apparatus 100A is provided with a first transporting portion 150 for transporting the web W located in the sheet forming portion 30. The first transporting portion 150 according to the present embodiment is disposed downstream of the sheet forming portion 30 in the transportation direction of the web W. The first transporting portion 150 includes a pair of rollers 151.

In addition, in the present embodiment, a second transporting portion 160 is disposed upstream of the sheet forming portion 30 in the transportation direction of the web W. The second transporting portion 160 is a subsidiary transporting portion for assisting the first transporting portion 150 and for transporting the web W with the first transporting portion 150. The second transporting portion 160 includes a pair of rollers 161.

A buffer portion 200 is disposed upstream of the sheet forming portion 30 in the transportation direction of the web W. In the present embodiment, the buffer portion 200 is disposed between the second web forming portion 70 and the second transporting portion 160. The buffer portion 200 includes a moving roller 210 that pushes the web W while moving in the moving direction of the sheet forming portion 30 (moving direction of the upper mold portion 34).

The moving roller 210 is configured to move while the web W is nipped in the sheet forming portion 30. The moving roller 210 is configured to push the web W with a substantially constant weight. In the present embodiment, the moving roller 210 is configured to push the web W with the weight of the moving roller 210. Consequently, a substantially constant force is applied to the web W in the substantially constantly downward direction in the vertical direction. In this regard, a substantially constant tension being continuously applied to the web W eliminates retention of the web W in the transportation passage and enables the remaining web W to be suppressed from being folded.

Since the compression-heating portion 31 according to the present embodiment presses the web W by using the flat plate 35 while the transportation of the web W is stopped, the web W is not pulled in the transportation direction during pressing compared with the instance in which the compression-heating roller is used. Consequently, the directivity of the fiber constituting the web does not appear. Therefore, since the sheet S not having anisotropy can be produced, the characteristics, such as stiffness and bending strength, of the sheet S can be improved.

In this regard, according to the sheet producing method and the sheet producing apparatus 100A of the present embodiment, the advantages similar to that of the first embodiment can be exerted.

The present disclosure includes substantially the same configuration as the configuration described in the embodiment, for example, a configuration having the same function, method, and result or a configuration having the same purpose and advantage. In addition, the present disclosure includes a configuration in which non-essential portions of the configuration described in the embodiment are replaced. The present disclosure includes a configuration which exerts the same operation and advantage of the configuration described in the embodiment or a configuration which can achieve the same purpose. The present disclosure includes a configuration in which a known technology is added to the configuration described in the embodiment.

The following contents are derived from the above-described embodiments.

The sheet producing method according to the present embodiment includes the web forming step of forming the web by accumulating the fiber in a dry system, the water providing step of providing the web with water, and the compression-heating step of compressing and simultaneously externally heating the web provided with water. In the sheet producing method, the water content of the web W provided with water in the water providing step is 12% by mass or more, and the compression degree of the web W between before and after the compression-heating step is $1/7$ or less.

According to the sheet producing method above, the fiber can be suppressed from deteriorating during compression in the compression-heating step. Therefore, the sheet having excellent strength and being suitable for repeated recycling can be produced.

In the sheet producing method according to the present embodiment, the compression degree of the web between before and after the compression-heating step is $1/18$ or more.

According to the sheet producing method above, the fiber can be further suppressed from deteriorating during compression.

In the sheet producing method according to the present embodiment, the water content of the web provided with water is 40% by mass or less.

According to the sheet producing method above, the water content of the web being set to be 40% by mass or less enables the content of the web to be suppressed from becoming nonuniform due to the water being squeezed out when compression is performed so that the compression degree is set to be $1/7$ or less.

In the sheet producing method according to the present embodiment, the heating temperature of the web in the compression-heating step is 60° C. or higher and 100° C. or lower.

According to the sheet producing method above, the hydrogen bonds between fibers can be more effectively formed, and the sheet can have sufficient strength.

In the sheet producing method according to the present embodiment, the compression-heating time in the compression-heating step is 0.5 sec or more.

According to the sheet producing method above, the compression-heating time being 0.5 sec or more enables water to sufficiently permeate the web. As a result, the quality when repeated recycling is performed is further improved, and the strength of the sheet can be further enhanced.

In the sheet producing method according to the present embodiment, the web contains starch or dextrin.

According to the sheet producing method of the present embodiment above, the strength of the sheet can be further enhanced.

The sheet producing apparatus according to the present embodiment includes the web forming portion (second web forming portion) for forming the web by accumulating the fiber in a dry system, the water providing portion for providing the web with water, and the compression-heating portion for compressing and simultaneously externally heating the web provided with water. In the sheet producing apparatus, the water content of the web provided with water in the water providing portion is 12% by mass or more, and the compression degree of the web between before and after the compression-heating portion is $1/7$ or less.

According to the sheet producing apparatus above, the fiber can be suppressed from deteriorating during compression by the compression-heating portion. Therefore, the sheet having excellent strength and being suitable for repeated recycling can be produced.

What is claimed is:

1. A sheet producing method comprising:
 a web forming step of forming a web by accumulating fiber in a dry system;

a water providing step of providing the web with water; and a compression-heating step of compressing and simultaneously externally heating the web provided with water, wherein a water content of the web provided with water in the water providing step is 12% by mass or more, and a compression degree of the web, which is a ratio of a thickness of the web after the compression-heating step to a thickness of the web before the compression-heating step, is 1/7 or less.

2. The sheet producing method according to claim 1, wherein the compression degree of the web is 1/18 or more.

3. The sheet producing method according to claim 1, wherein the water content of the web provided with water in the water providing step is 40% by mass or less.

4. The sheet producing method according to claim 1, wherein a heating temperature of the web in the compression-heating step is 60° C. or higher and 100° C. or lower.

5. The sheet producing method according to claim 1, wherein a compression-heating time in the compression-heating step is 0.5 sec or more.

6. The sheet producing method according to claim 1, wherein the web contains starch or dextrin.

7. A sheet producing apparatus comprising:

a web forming portion that forms a web by accumulating fiber in a dry system;

a water providing portion that provides the web with water; and a compression-heating portion that compresses and simultaneously externally heats the web provided with water, wherein the water providing portion provides the web with the water such that a water content of the web provided with water is 12% by mass or more, and the compression-heating portion compresses and simultaneously externally heats the web provided with water such that a compression degree of the web, which is a ratio of a thickness of the web after the web is compressed and heated to a thickness of the web before the web is compressed and heated, is 1/7 or less.

* * * * *